UNITED STATES PATENT OFFICE.

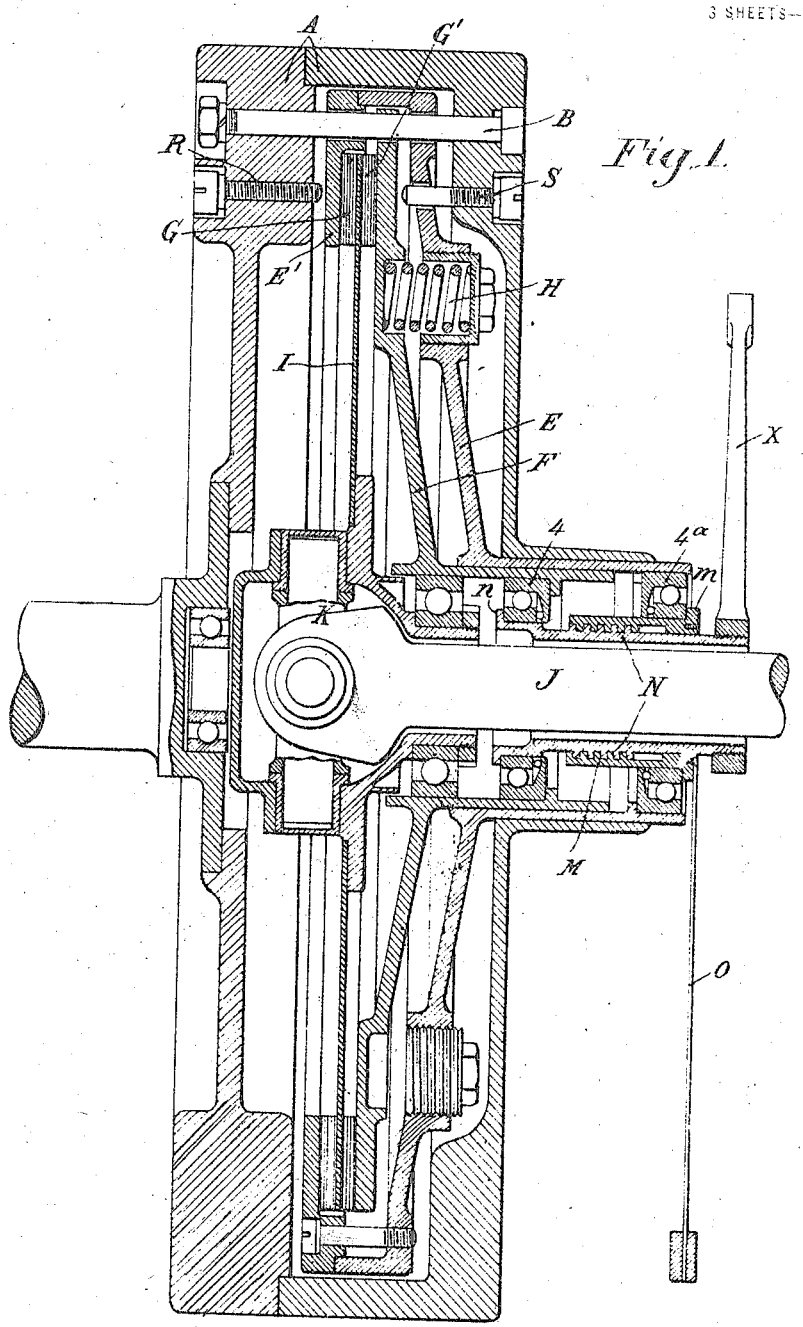

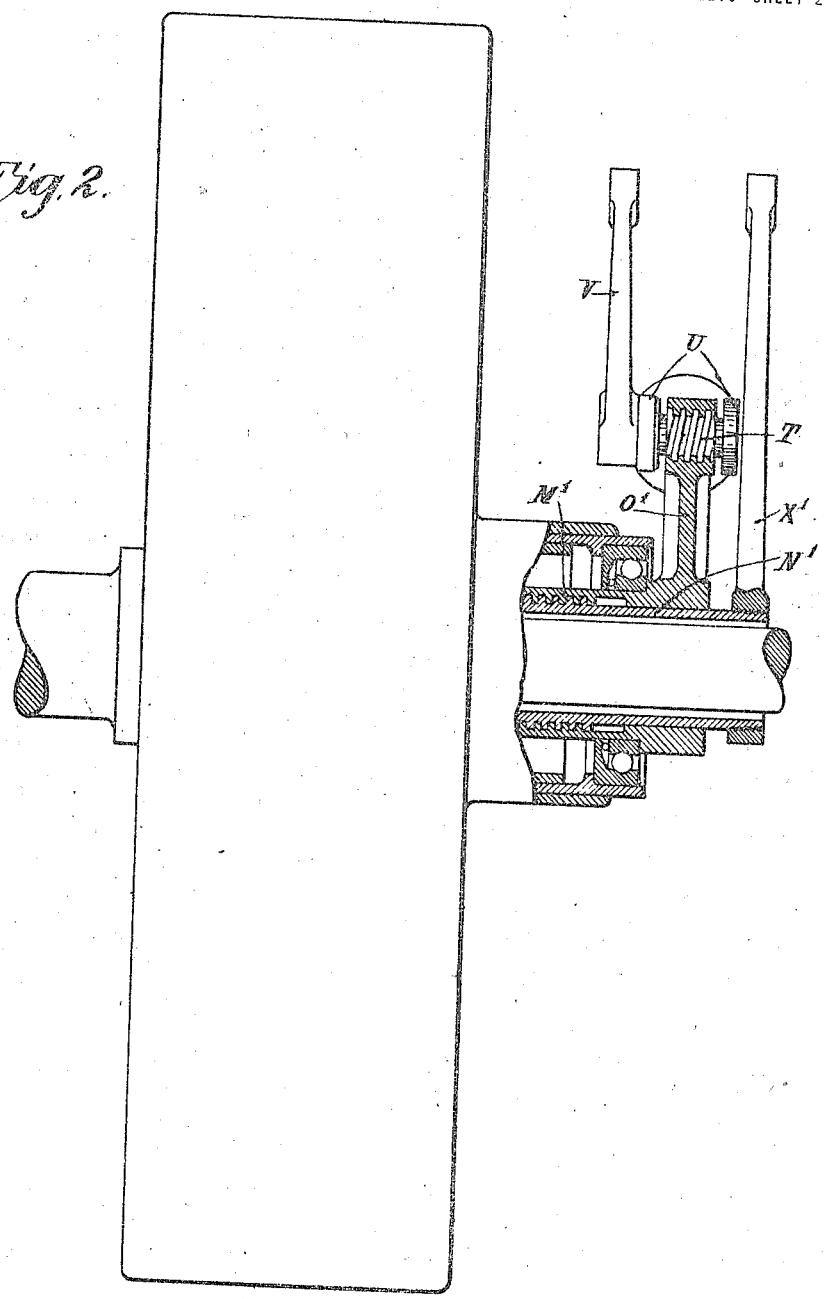

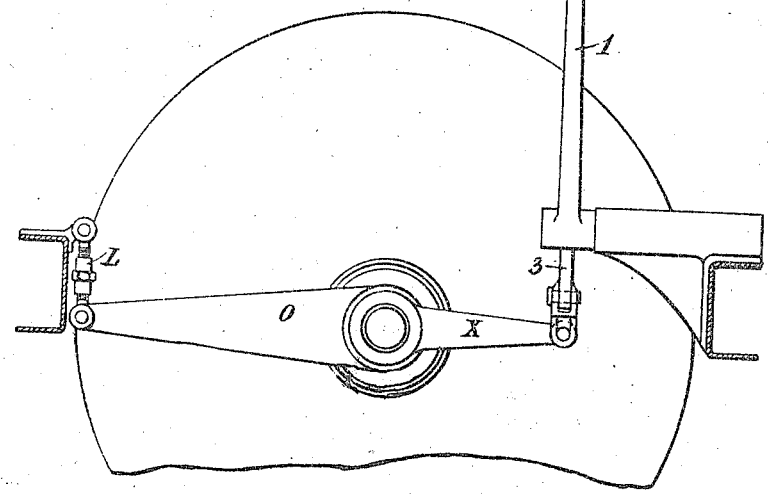
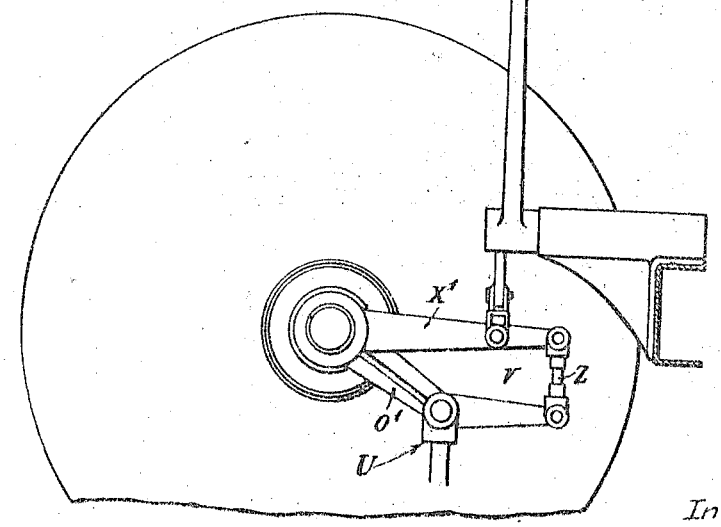

ISAAC KOECHLIN, OF LEVALLOIS-PERRET, FRANCE, ASSIGNOR TO SOCIETE ANONYME DES AUTOMOBILES & CYCLES PEUGEOT, OF PARIS, FRANCE.

DISK CLUTCH.

1,270,529.

Specification of Letters Patent.   Patented June 25, 1918.

Application filed June 12, 1916.   Serial No. 103,320.

*To all whom it may concern:*

Be it known that I, ISAAC KOECHLIN, a citizen of the Republic of France, residing at 71 Rue Danton, Levallois-Perret, Seine, France, have invented new and useful Improvements in Disk Clutches, of which the following is a specification.

This invention relates to a disk clutch for transmitting power from a driving shaft to a driven shaft, and is particularly applicable for use upon automobiles.

The chief object is to provide a clutch of this type in which the thrust required to release the disks is taken up between the plates themselves and is therefore not transmitted either to the motor or to the driven parts. A further object is to provide means whereby release of the disks or frictional plates upon both sides is assured.

My invention consists in the construction, combination and arrangement of parts as herein illustrated, described and claimed.

In the accompanying drawings forming part hereof, is illustrated a form of embodiment of the invention, in which drawings similar reference characters designate corresponding parts, and in which:

Figure 1 is a longitudinal section of the clutch through the center;

Fig. 2 is a sectional elevation of the clutch showing a variation of the arrangement for producing the release of the surfaces in contact;

Fig. 3 shows a side elevation of the mechanism for controlling a clutch of the type shown in Fig. 1, and Fig. 4 shows a side elevation of the mechanism for controlling a clutch of the type shown in Fig. 2.

Referring to Fig. 1 it will be seen that the fly wheel A of the motor is formed in two parts which are assembled and held together by the bolts B, the heads of which are countersunk in the faces of the fly wheel. Plates E—E' and F are located within the fly wheel and have holes through which the bolts B pass, so that these plates rotate with the fly wheel. The plate E—E' is formed in two pieces E and E' to permit of mounting. These plates turn then with the motor as illustrated and may of course be driven by any other means. They have near their periphery, friction or wearing surfaces or parts G, G¹ of metal or other appropriate material; and bearing between the plates E and F is a series of springs H arranged to cause the plates to pinch or grip a driven plate or disk I between the friction surfaces G, G¹. This disk I is fixed upon the driven shaft J either directly by bolts or in any suitable manner such as is indicated in the drawing.

The driven shaft J is coupled at its other end to the transmission parts of the vehicle.

The springs H exert a force upon the plates E, F, causing sufficient pressure upon the friction surfaces of the driven disk I for transmitting to this disk, and thereby to the driven shaft J, the power of the motor.

It suffices to withdraw one or other of the disks E and F in order that the disengagement may be effected.

The inner parts of the plates E and F are fitted with extensions adapted to rest upon ball-bearings 4 and 4ᵃ. One of these bearings, 4, rests upon a collar N concentric with the driven shaft J, and the other bearing, 4ᵃ, rests upon a collar M which bears upon the collar N. The collar N has a thread cut thereon which meshes with a thread cut inside of the collar M so that when one of these collars is rotated with respect to the other the thread causes them to have relative longitudinal motion. The collar N is fitted with a small flange $n$ adapted to bear against the bearing 4 so that motion of the collar is thus transmitted to the plate F. The collar M has a similar flange $m$ which acts upon the bearing 4ᵃ and transmits longitudinal movement to the plate E. The collar or screw M has an arm O fixed to its free end either directly or through a connection L being fastened to any point of the chassis to prevent rotation of the collar M (see Figs. 1 and 3).

The collar or screw N has fixed to it an arm X which is operated by the pedal 1 for disengagement through the crank 2 and the connection 3 (see Fig. 3). Movement of this pedal causes an angular displacement of the screw N in the nut M thus causing the bearings 4 and 4ᵃ to be moved toward each other and the plates E and F to be moved so that the friction surfaces G and G' are moved away from contact with the disk I.

In order to avoid the disengagement being made on a single side of the disk only so that one of the surfaces G or G¹ remains in contact with the disk, there have been provided abutments R and S (Fig. 1) carried by the fly wheel and against which the plates E¹ and F bear when the clutch is fully open. The arm O mounted on the collar M is therefore preferably articulated at its point of attachment to the chassis as in Fig. 3 in order to permit that this collar M be longitudinally displaced to allow of disengagement of the clutch. Likewise the arm X of the screw N is free to be displaced in the opposite direction when the clutch is operated.

Figs. 2 and 4 of the drawings show a variation that permits of obtaining the same regulation of movement as with the abutments R and S of Fig. 1. In this case the arm O, Fig. 1, is replaced by the rigid arm O', Fig. 2. This arm O' is provided at its extremity with a threaded hole serving for a nut to a screw T bearing a lever V. This screw is rotatably mounted in a bearing U fixed on the chassis, and is held thereby from having axial movement.

As is shown, in Fig 4 the arm X' attached to the screw N¹ and the lever V are bound by a connection Z pivoted to the arms X' and V in such a fashion that the movement of the pedal causes an angular displacement of these arms. The motion of the arm X' causes rotary movement of the collar N' in the collar M', this causing the plates to spread apart. At the same time the arm V rotates the screw T thus causing longitudinal movement of the collar M', and the threads on the screw T and the threads on the collars N' and M' are so designed that the plates E and F move approximately equal distances away from the disk I as the clutch is released.

It is to be remarked that, whatever the position, engaged or disengaged, the reactions occasioned by the forces of the springs and by the efforts of disengagement are always balanced and taken up between the plates and there cannot therefore result any thrust either on the motor or on the driven shaft.

Having now described my invention, I claim and desire to secure by Letters Patent:

1. A disk clutch containing in combination, a driving shaft, a flywheel in two parts forming a continuous casing mounted upon said shaft, two plates disposed inside said flywheel, means for assembling said plates, means whereby the flywheel produces the movement of the assembled plates, a driven shaft, a disk keyed to said shaft and disposed between said assembled plates, the disk having one side normally in contact with one of said plates, a third plate disposed between the two assembled plates and normally in contact with the second side of said disk, means whereby the flywheel drives the third plate, springs disposed between the third plate and the plate of the assembled pair which is not in contact with the disk, two threaded collars screwed one upon the other and mounted upon the driven shaft, means for producing the rotation of one of these collars, means for preventing the rotation of the other collar and means whereby the longitudinal displacement of said collars is transmitted to the assembled plates and the third plate, substantially as described and for the purpose set forth.

2. A disk clutch containing in combination, a driving shaft, a flywheel in two parts forming a continuous casing mounted on said shaft, bolts for assembling these two parts of the flywheel, two plates disposed within the flywheel and traversed by said bolts, assembling bolts for the said two plates, a driven shaft, a disk keyed to said shaft and disposed between said assembled plates, the disk having one side normally in contact with one of said plates, a third plate disposed between the two assembled plates, traversed by the flywheel assembling bolts, and normally in contact with the second side of said disk, springs disposed between the third plate and the plate of the assembled pair which is not in contact with the disk, cylindrical extension pieces each being attached to one of these two latter plates respectively, these pieces surrounding the main shaft, threaded collars screwed one upon the other and mounted upon the driven shaft, ball bearings disposed between said collars, abutments provided on said collars, means for producing the rotation of one of said collars, means for preventing the rotation of the other collar, and abutments disposed on the two parts of the flywheel for limiting the movement of the plates in contact with the disks, substantially as described and for the purpose set forth.

In testimony whereof I have signed my name to this specification.

ISAAC KOECHLIN.

Witnesses:
Louis Moses,
Chas. P. Pressley.